United States Patent
Gostin et al.

(10) Patent No.: US 9,342,452 B2
(45) Date of Patent: May 17, 2016

(54) MAPPING PROCESSOR ADDRESS RANGES TO PERSISTENT STORAGE

(75) Inventors: Gary Gostin, Plano, TX (US); Craig Warner, Coppell, TX (US); John W Bockhaus, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 177 days.

(21) Appl. No.: 14/349,070

(22) PCT Filed: Oct. 7, 2011

(86) PCT No.: PCT/US2011/055226
§ 371 (c)(1),
(2), (4) Date: Apr. 1, 2014

(87) PCT Pub. No.: WO2013/052061
PCT Pub. Date: Apr. 11, 2013

(65) Prior Publication Data
US 2014/0250274 A1    Sep. 4, 2014

(51) Int. Cl.
*G06F 12/02* (2006.01)
*G06F 12/08* (2006.01)
*G06F 12/06* (2006.01)
*G06F 13/16* (2006.01)

(52) U.S. Cl.
CPC ............ *G06F 12/06* (2013.01); *G06F 12/0223* (2013.01); *G06F 12/0802* (2013.01); *G06F 12/0815* (2013.01); *G06F 12/0873* (2013.01); *G06F 13/16* (2013.01); *G06F 2212/2024* (2013.01)

(58) Field of Classification Search
CPC . G06F 12/0223; G06F 12/06; G06F 12/0615; G06F 12/063; G06F 12/0802; G06F 12/0815; G06F 12/0866; G06F 12/0873
See application file for complete search history.

(56) References Cited

U.S. PATENT DOCUMENTS

| | | | |
|---|---|---|---|
| 5,860,079 A | 1/1999 | Smith | |
| 6,073,209 A | 6/2000 | Bergsten | |
| 6,138,176 A | 10/2000 | McDonald et al. | |
| 7,302,514 B2 | 11/2007 | Ouriel et al. | |
| 7,502,877 B2 | 3/2009 | Huggahalli et al. | |
| 7,769,919 B2 | 8/2010 | Lipps et al. | |
| 7,882,327 B2 | 2/2011 | Kalyanasundharam et al. | |
| 8,898,417 B1 * | 11/2014 | Post ........................ | G06F 12/00 711/168 |
| 2001/0027512 A1 | 10/2001 | Hagersten | |

(Continued)

FOREIGN PATENT DOCUMENTS

GB    2260630 A    4/1993

OTHER PUBLICATIONS

International Searching Authority, International Search Report and Written Opinion, Appln No. PCT/US2011/055226, date of mailing May 23, 2012, 9 p.

(Continued)

*Primary Examiner* — Hal Schnee
(74) *Attorney, Agent, or Firm* — Hewlett Packard Enterprise Patent Department (57) ABSTRACT

A computer apparatus and related method to access storage is provided. In one aspect, a controller maps an address range of a data block of storage into an accessible memory address range of at least one of a plurality of processors. In a further aspect, the controller ensures that copies of the data block cached in a plurality of memories by a plurality of processors are consistent.

12 Claims, 6 Drawing Sheets

(56) References Cited

U.S. PATENT DOCUMENTS

| | | | |
|---|---|---|---|
| 2004/0215898 A1* | 10/2004 | Arimilli | G06F 12/1027 711/144 |
| 2009/0019232 A1* | 1/2009 | Deshpande | G06F 12/1045 711/141 |
| 2009/0113164 A1* | 4/2009 | Rajamony | G06F 12/1072 711/202 |
| 2010/0095053 A1 | 4/2010 | Bruce et al. | |
| 2010/0293439 A1 | 11/2010 | Flynn et al. | |

OTHER PUBLICATIONS

EPO, EP Extended Search Report, mailed Jun. 17, 2015, EP Application No. 11873708.9, 7 pps.

* cited by examiner

MAPPING PROCESSOR ADDRESS RANGES TO PERSISTENT STORAGE

BACKGROUND

The advent of cloud computing and handheld devices has increased the demand for faster and more reliable access to data. Database performance relies heavily on the average access time of storage by a processor. Systems heretofore utilize various techniques to enhance the performance of data transfers between processors and storage.

DETAILED DESCRIPTION

Retrieval of data from random access memory ("RAM") is generally faster than retrieval from storage. As such, many past attempts to minimize the latency between processors and storage involve a variety of RAM caching strategies. However, the range of addresses available in storage is typically broader than the memory address space of a processor. Accordingly, the cached data must be frequently transferred to and from storage to ensure the processor has access to a necessary portion of storage in the memory cache. The constant exchange between RAM and storage is less than ideal and has a negative impact on performance.

Aspects of the application provide a computer apparatus and method to access storage directly with a processor. In one aspect, an address range of a data block in a persistent storage medium may be mapped into an accessible memory address range of at least one processor of a plurality of processors. In another aspect, the consistency of copies of requested portions of the data block cached in a plurality of memories is maintained.

The aspects, features and advantages of the application will be appreciated when considered with reference to the following description of examples and accompanying figures. The following description does not limit the application; rather, the scope of the application is defined by the appended claims and equivalents.

Figure 1:
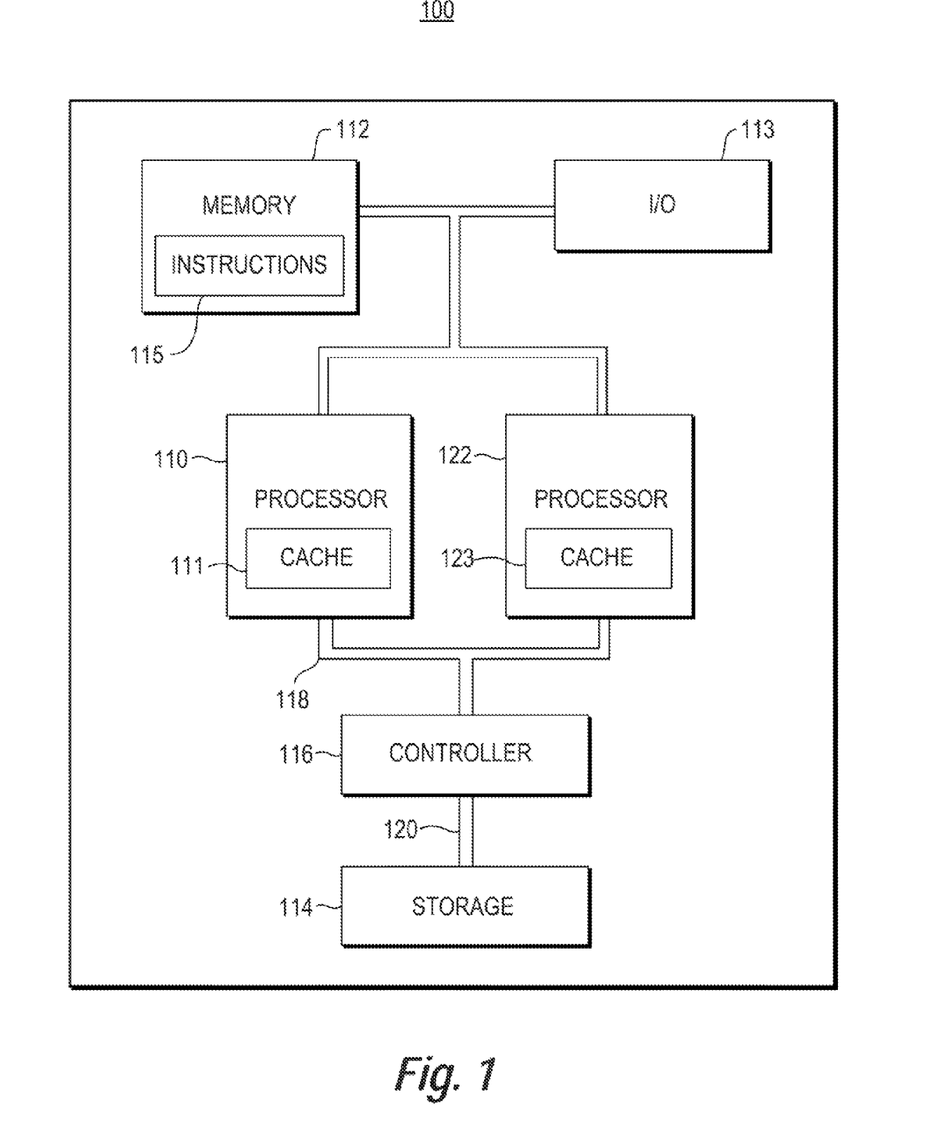
FIG. 1 illustrates a computer apparatus in accordance with aspects of the application.

FIG. 1 presents a schematic diagram of an illustrative computer apparatus 100 depicting various components in accordance with aspects of the application. The computer apparatus 100 may include all the components normally used in connection with a computer. For example, it may have a keyboard, mouse, and/or various other types of input devices such as pen-inputs, joysticks, buttons, touch screens, etc., as well as a display, which could include, for instance, a CRT, LCD, plasma screen monitor, TV, projector, etc. The computer apparatus 100 may also contain processors 110 and 122, memory 112, and storage 114. Memory 112 may store instructions 115 that may be retrieved and executed by processors 110 and 122. In one example, memory 112 may be a RAM device, such as a dynamic random access memory ("DRAM") device. In a further example, memory 112 may be divided into multiple memory segments organized as dual in-line memory modules ("DIMMs").

The processors 110 and 122 may be any number of well known processors, such as processors from Intel® Corporation. Alternatively, the processors may be dedicated controllers for executing operations, such as an application specific integrated circuit ("ASIC"). Processors 110 and 122 may comprise local caches 111 and 123 respectively. Each local cache may be formed from static random access memory ("SRAM") devices, either as a single level cache memory or as a multilevel cache memory having a cache hierarchy. Processors 110 and 122 may also be communicatively coupled to an input/output ("I/O") interface 113 that interfaces to basic input/output devices such as a keyboard, a mouse, or a monitor. While only two processors and one memory are shown in FIG. 1, it is understood that computer apparatus 100 may have additional processors and memories and that FIG. 1 is merely illustrative.

The instructions 115 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. Instructions 115 may configure processors 110 and 122 to write and read data to and from storage 114.

Storage 114 may be a storage medium that allows information to be retrieved, manipulated, and stored by processors 110 and 122. Storage 114 may utilize memristor technology postulated by Leon Chua in 1971. The name memristor is an abbreviation of memory resistor. Memristors are two terminal passive devices whose resistance state depends on its previous state and on its present electrical biasing conditions. Given their structural simplicity and electronic passivity, memristors may be adapted for use as a storage medium. However, storage 114 may be other types of nonvolatile storage devices, such as phase change memory ("PCM") or spin-torque transfer RAM ("STT-RAM"). In another example, the storage may be flash memory or battery backed DRAM. Storage 114 may also be divided into multiple segments organized as DIMMs. In a further example, storage 114 may be in a location physically remote from, yet still accessible by, processors 110 and 122. In yet a further example, data may be distributed across multiple storage devices.

FIG. 1 also shows a controller 116 that may be any type of chipset or control logic that handles communication between storage 114 and processors 110 and 122. The controller 116 may be a programmable logic device (PLD), programmable logic array (PLA), an ASIC, etc. First bus 118 may be utilized to communicatively couple controller 116 with processors 110 and 122. First bus 118 may be a high speed/frequency serial link such as Intel® QuickPath Interconnect. In another example, first bus 118 may comply with the HyperTransport Specification, Revision 3.1, HyperTransport Technology Consortium, released Aug. 18, 2008 and/or other revisions. Second bus 120 may be of the same or different technology than first bus 118. While FIG. 1 shows controller 116 directly coupled to processor 110, processor 122, and storage 114, it should be understood that other components or devices may be arranged and configured therebetween. In that regard, it should be understood that other components or devices may be arranged and configured between processor 110, processor 122, memory 112 and I/O interface 113. Although all the components of computer apparatus 100 are functionally illustrated in FIG. 1 as being within the same block, it will be understood that the components may or may not be stored within the same physical housing.

Computer apparatus 100 may comprise circuitry (not shown) suitable for communication with other computers or devices, such as an Ethernet interface that implements a standard encompassed by the Institute of Electrical and Electronic Engineers ("IEEE"), standard 802.3. In another example, computer apparatus 100 may utilize a wireless fidelity ("Wi-Fi") interface in accordance with the IEEE 802.11 suite of standards. It is understood that other standards or protocols may be utilized, such as Bluetooth or token ring.

Figure 2:
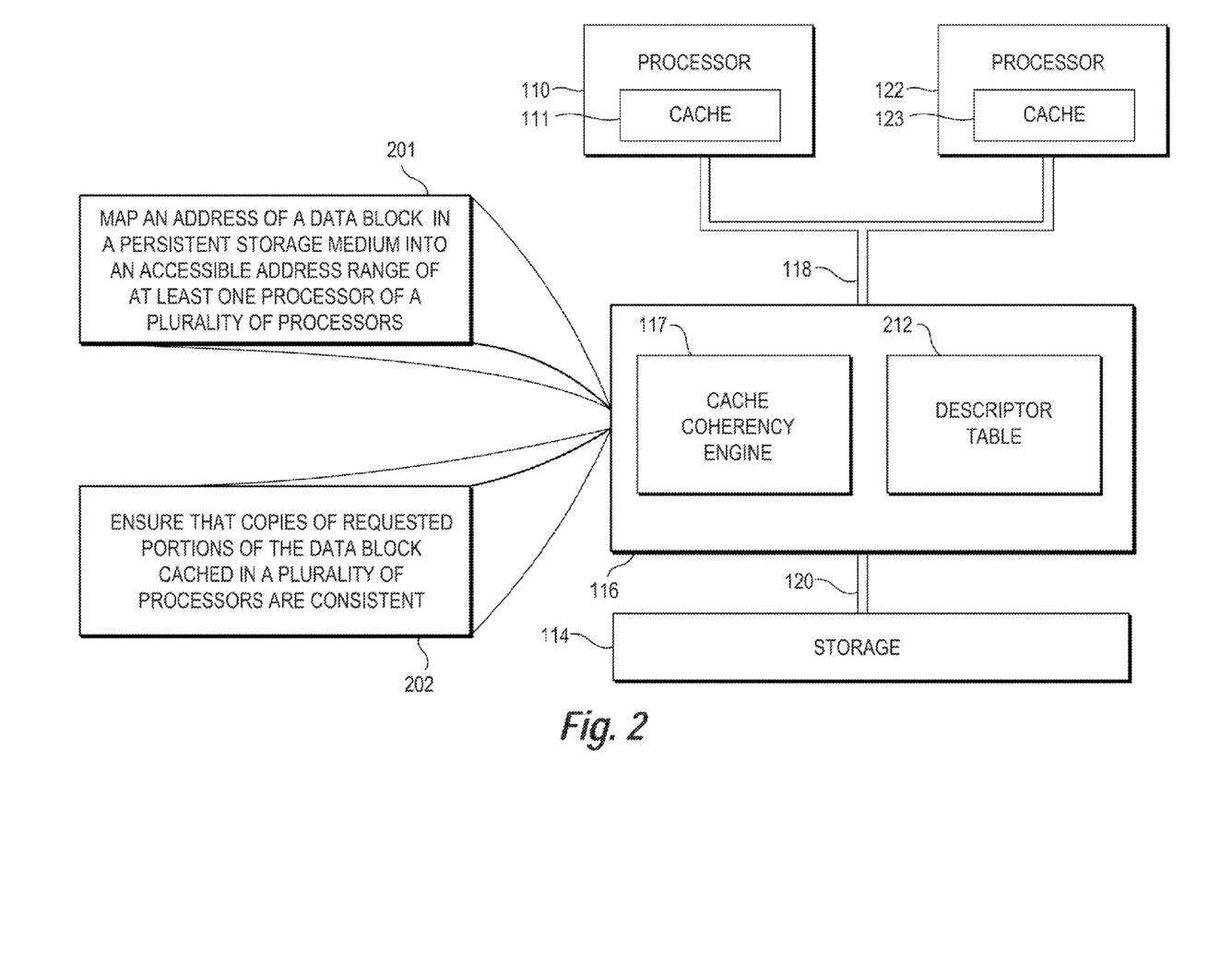
FIG. 2 is a close up illustration of a controller in accordance with aspects of the application.

FIG. 2 presents a close up illustration of controller 116 in accordance with aspects of the present disclosure. One possible function of controller 116 may be to map an address of a data block in a persistent storage medium into an accessible memory address range of at least one processor of a plurality of processors, as recited in block 201. An aperture is defined herein as a predetermined range of addresses within a processor's accessible range of memory addresses. Descriptor table 212 may store a plurality of descriptors each of which may comprise an association between an aperture and a block of storage. While the association between an aperture and a block of storage in the descriptor may be altered, a descriptor may be associated with only one aperture. An aperture's association with a block of storage may be altered by modifying the block of storage indicated in the descriptor. The block of storage may then be directly accessed by the processors or I/O devices via the address range of the aperture. Each descriptor may also comprise a pointer or index of a block of storage to be associated with an aperture and at least one flag indicating the type of access permitted for the block of storage corresponding to the aperture (e.g., read access, write access, etc.). While FIG. 2 shows descriptor table 212 arranged in controller 116, it will be understood that descriptor table 212 may be stored in volatile or non-volatile memory at a location other than controller 116. Descriptor table 212 may be implemented in the form of hardware, software, or a combination of hardware and software.

Another possible function of controller 116 may be to ensure that copies of requested portions of the data block cached in a plurality of memories by a plurality of processors are consistent (i.e., cache coherency), as recited in block 202. The memories may be cache memory or other local memories. Controller 116 may comprise a cache coherency engine 117 that may be, for example, a hardwired state machine for managing the cache coherency between the processors and storage. Cache coherency engine 117 may ensure that updates to data by one processor are applied to copies of the same data cached by other processors. In another example, cache coherency engine 117 may ensure that data in storage 114 is consistent with data cached by a processor. As with descriptor table 212, cache coherency engine 117 may also be implemented in the form of hardware, software, or a combination of hardware and software.

Figure 3:
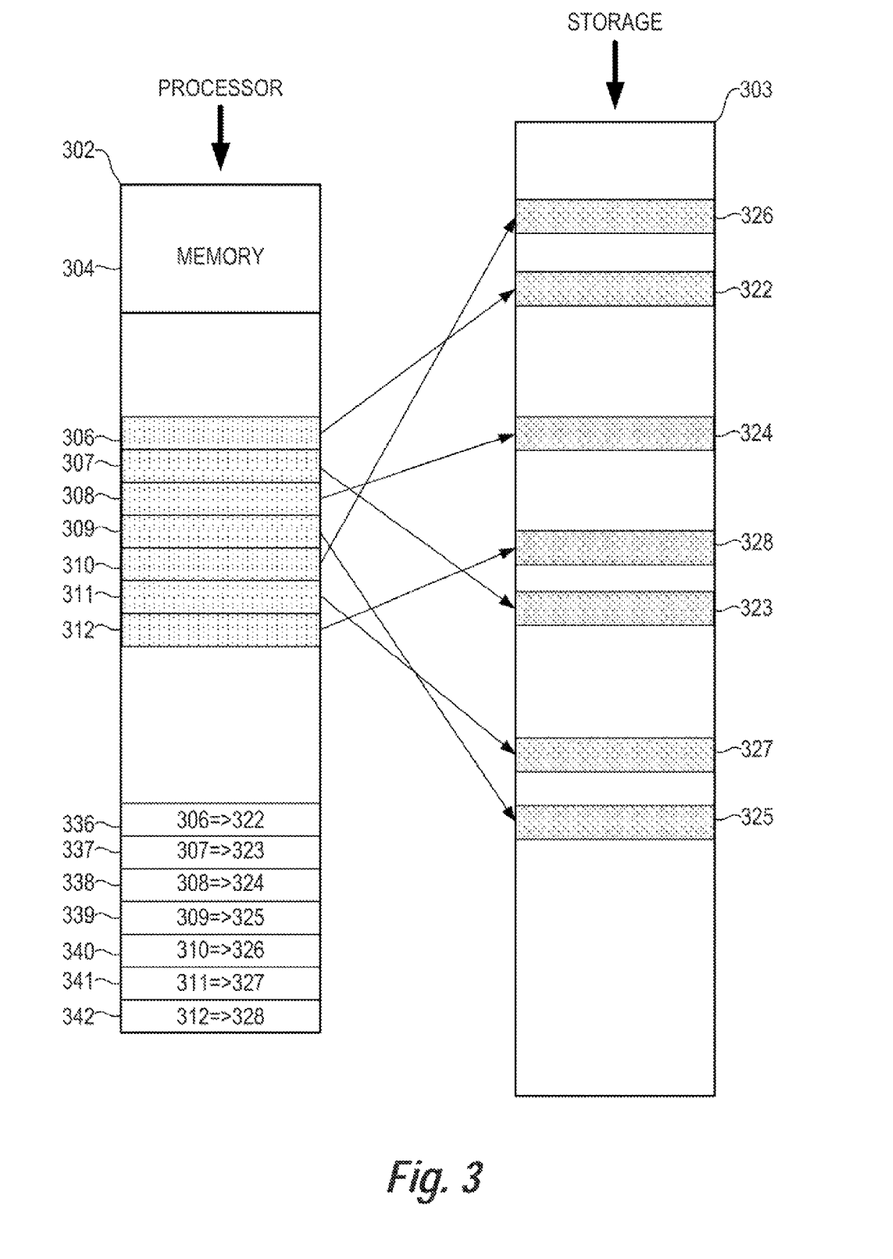
FIG. 3 is an illustrative address space of a processor and storage.

In FIG. 3, address space 302 represents an illustrative memory address space of a processor and address space 303 represents an illustrative address space of storage. The range of memory addresses accessible by a processor is generally limited by the width of its address bus and registers. The range of addresses of storage is typically broader than the range accessible by a processor. For example, if storage 114 is a memristor storage device, the address range of storage 114 may be approximately $2^{64}$ bytes, while the address range of a processor may be approximately $2^{46}$ bytes. Furthermore, a portion of a processor's address space may be reserved for other purposes. In the example of FIG. 3, address range 304 is an area of address space dedicated to memory 112.

In one example, the size of the aperture may be consistent with a storage block size determined by an operating system of computer apparatus 100. In another example, instructions 115 may determine the size of the aperture. An aperture may correspond to an equally-sized range of addresses in storage (i.e., a block of storage). For example, apertures 306-312 of FIG. 3 may correspond to data blocks 322-328 respectively. Data blocks 322-328 are shown scattered throughout address space 303. Descriptors 336-342 may each represent an association between an aperture and a block of storage. If processor 110 requires portions of data from, for example, storage block 322, processor 110 may use descriptor 336 to associate aperture 306 with storage block 322, as shown in FIG. 3, Since aperture 306 has a range of addresses within the address space of processor 110, the processor may access portions of storage block 322 by referencing the addresses of aperture 306. Thus, processor 110 may still access storage block 322, even if the addresses thereof are outside the processor's address space.

Figure 4:
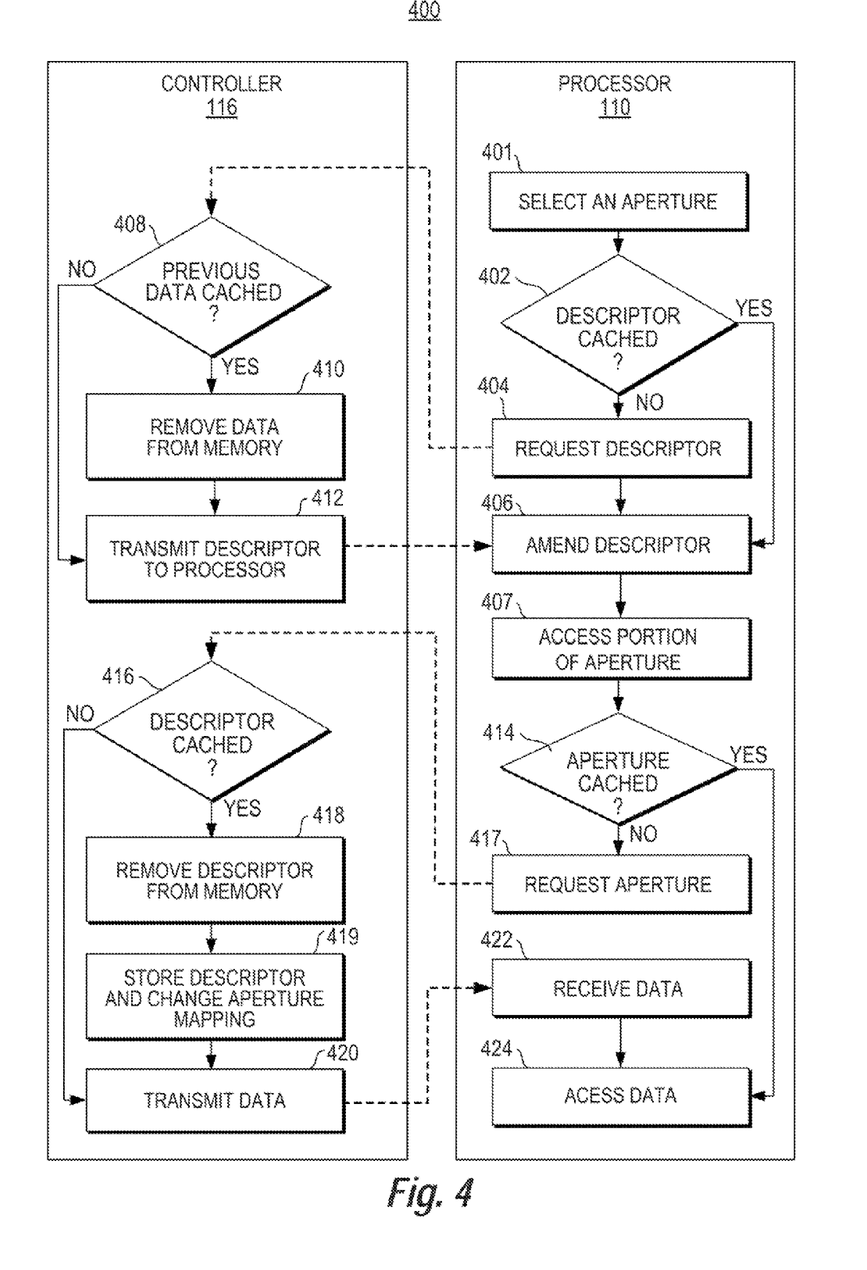
FIG. 4 illustrates a flow diagram in accordance with aspects of the application.
Figure 5:
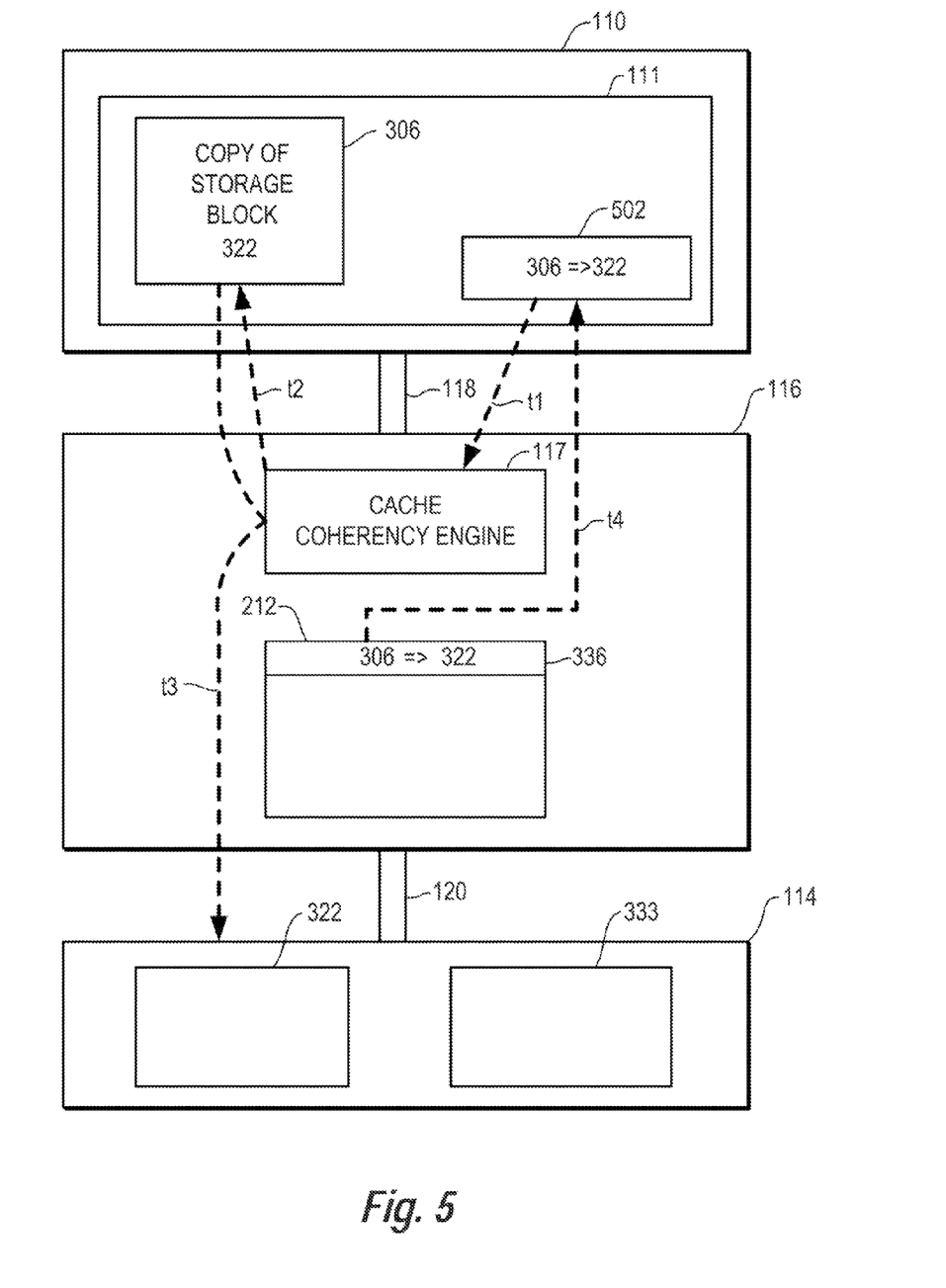
FIG. 5 is a working example of data being stored in accordance with aspects of the application.
Figure 6:
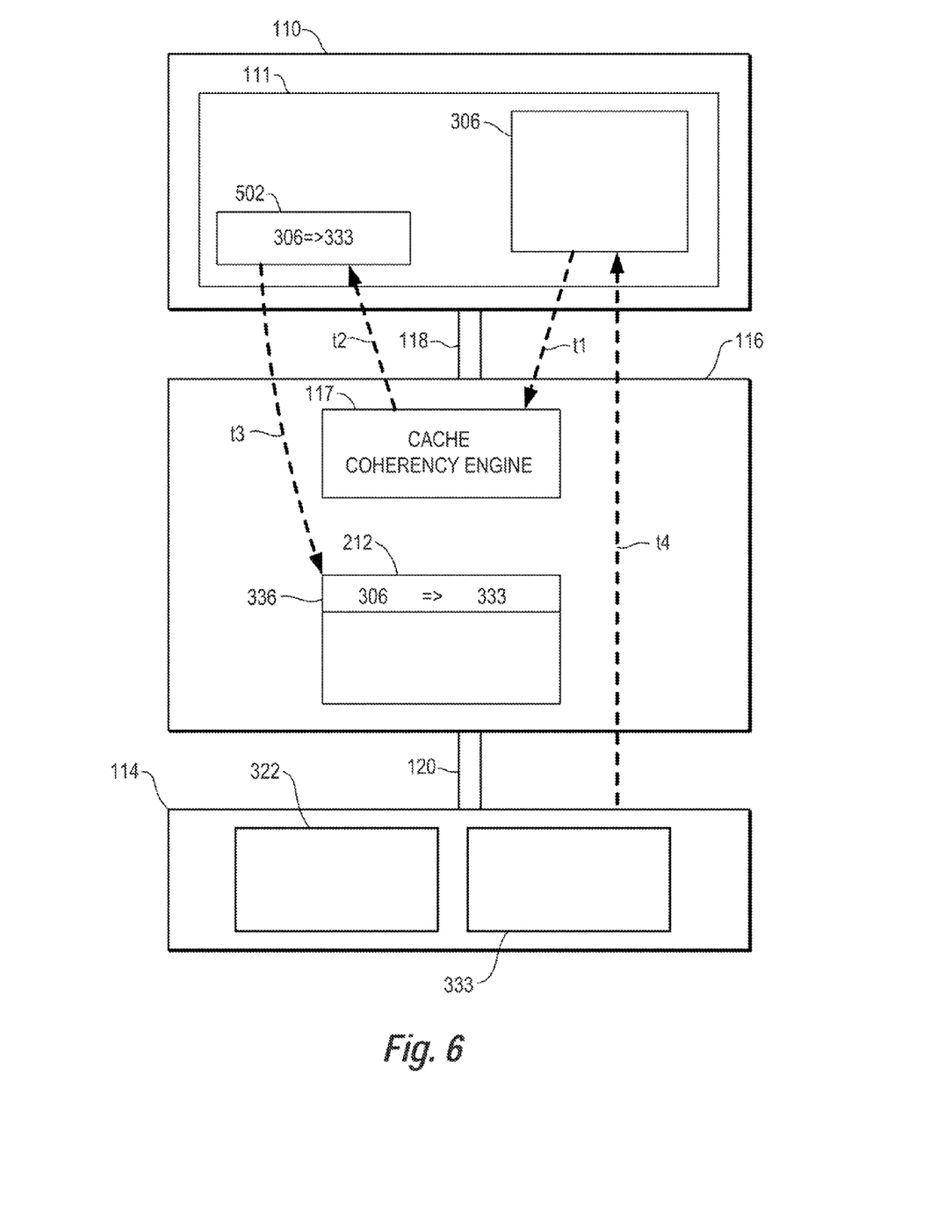
FIG. 6 is a working example of data being transferred to a processor in accordance with aspects of the application.

One working example of the system and method is shown in FIGS. 4-6. In particular, FIG. 4 illustrates a flow diagram of a process 400 for transferring data from storage directly to one of a plurality of processors. For ease of illustration, the following working example concentrates on communications between controller 116 and processor 110. FIGS. 5-6 illustrate aspects of storage data transfer. The actions shown in FIGS. 5-6 will be discussed below with regard to the flow diagram of FIG. 4.

In block 401 of FIG. 4, the processor selects an aperture. Before associating the aperture with a storage block, processor 110 may determine whether the descriptor associated with the aperture has been cached, as shown in block 402. If the descriptor is not cached, a cache miss results and processor 110 may request the descriptor, as shown in block 404. Before providing the descriptor, in block 408, controller 116 may determine whether a previously requested portion of the data block currently associated with the aperture is still cached in a memory, such as local cache 111. If a previously requested portion of a data block is cached in memory, controller 116 may remove the data block portions therefrom, transferring any modified data to the corresponding data block in storage 114, as shown in block 410. This may ensure that all modifications to the data block have been stored in and committed to storage 114 before the processor accesses the descriptor. Referring to the example in FIG. 5, local cache 111 of processor 110 is shown having an aperture 306, which may contain a previously retrieved copy of block 322 from storage 114. At time t1 of FIG. 5, processor 110 may request a descriptor from cache coherency engine 117. Before transmitting a descriptor to processor 110, the cache coherency engine 117 of controller 116 may remove the contents of aperture 306 from local cache 111, at time t2. At time t3, cache coherency engine 117 may store the contents of aperture 306 in its corresponding address in storage 114. In the example of FIG. 5, descriptor 336 of descriptor table 212 indicates that aperture 306 is associated with address 322 in storage.

In block 412 of FIG. 4, controller 116 may transmit the descriptor to processor 110. As shown in FIG. 5, at time t4, processor 110 may receive the descriptor and store it in local cache 111 at location 502, permitting the processor to amend the descriptor. Referring back to FIG. 4, the processor may amend the descriptor so as to associate the corresponding aperture with a different storage block, as shown in block 406. Referring now to FIG. 6, the descriptor at cache location 502 may be changed so as to change the data block associated with aperture 306 from 322 to 333. In block 407 of FIG. 4, the processor may access a portion of the aperture that is now mapped to the newly selected storage block, data block 333. In block 414, processor 110 may determine if the requested portions of data from the newly mapped storage block has been cached via the selected aperture. If the data has not been cached, a cache miss results and the processor may request portions of the data block from storage via the aperture, as shown in block 417. Before forwarding the data, controller 116 may determine if the descriptor has been cached, as shown in block 416. If the descriptor has been cached, controller 116 may remove the descriptor therefrom, as shown in block 418. The controller may store the amended descriptor in the descriptor table, which changes the aperture mapping, as shown in block 419. This may ensure that modifications made to a previously requested descriptor are stored before the processor accesses the data block. The example of FIG. 6 illustrates the association between aperture 306 and storage block 333 being stored in descriptor 336 of descriptor table 212. At time t1 of FIG. 6, processor 110 may request portions of the new data block via aperture 306. Cache coherency engine 117 may retrieve the descriptor at time t2 and store it in descriptor table 112 at time t3. At time t4, the requested data block portions may be transferred from block 333 to processor 110 via aperture 306. Referring back to FIG. 4, in block 420 of FIG. 4, controller 116 may now transmit data from storage to the processor via aperture 306. In block 422, the processor may receive the data, and, in block 424, the processor may access the data.

Advantageously, the above-described apparatus and method allows a processor to directly access data from a storage device whose address range is broader than that of the processor. In this regard, the speed at which programs access databases is enhanced. In turn, end users experience less data retrieval latency.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosed examples as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. A computer apparatus comprising:
   a controller to:
      map an address range of a data block in a persistent storage medium into an accessible memory address range of at least one processor of a plurality of processors;
      ensure that copies of requested portions of the data block cached in a plurality of memories by the plurality of processors are kept consistent;
      store a descriptor, the descriptor comprising an association between an aperture and the data block, the aperture being a predetermined address range that is within the accessible memory address range of the at least one processor;
      ensure that modifications made by a processor of the plurality of processors to a previously requested data block are stored before the processor accesses a descriptor, the descriptor comprising an association between the aperture and the data block; and
      ensure that modifications made by the processor to a previously requested descriptor are stored before the processor accesses the data block.

2. The computer apparatus of claim 1, wherein the at least one processor is to:
   select an aperture, wherein the predetermined address range of the aperture is associated with the address range of the data block; and
   reference an address within the predetermined address range of the aperture to access a requested portion of the data block.

3. The computer apparatus of claim 1, wherein the descriptor is associated with the aperture.

4. The computer apparatus of claim 3, wherein the descriptor further comprises an index or pointer to the data block and at least one flag indicating access permissions for the data block when accessed via the aperture.

5. The computer apparatus of claim 3, wherein the controller is a controller to ensure that copies of the aperture and the descriptor cached by one processor are consistent with other copies of the aperture and the descriptor cached by other processors.

6. The computer apparatus of claim 1, wherein the persistent storage medium is a memristor device.

7. A computer apparatus comprising:
   a controller to:
      associate an aperture with a data block in a memristor storage device, the aperture being a predetermined address range within an accessible memory address range of at least one processor of a plurality of processors, the predetermined address range of the aperture corresponding to an address range of the data block;
      transfer a requested portion of the data block to the at least one processor via the aperture;
      ensure that copies of requested portions of the data block cached in a plurality of memories by the plurality of processors are kept consistent;
      ensure that modifications made by a processor to a previously requested data block are stored before the processor accesses a descriptor, the descriptor comprising an association between the aperture and the data block; and
      ensure that modifications made by the processor to a previously requested descriptor are stored before the processor accesses the data block.

8. The computer apparatus of claim 7, wherein the at least one processor is a processor to:
   select the aperture; and
   reference an address within the predetermined address range of the aperture to access the requested portion of the data block.

9. The computer apparatus of claim 7, wherein the controller is a controller to store the descriptor.

10. The computer apparatus of claim 9, wherein the descriptor is associated with the aperture.

11. The computer apparatus of claim 10, wherein the descriptor further comprises an index or pointer associated with the data block and at least one flag indicating access permissions for the data block when accessed via the aperture.

12. The computer apparatus of claim 11, wherein the controller is a controller to ensure that copies of the aperture and the descriptor cached by one processor are consistent with other copies of the aperture and the descriptor cached by other processors.

* * * * *